Sept. 8, 1931.  D. W. GUILES  1,822,346
FAUCET
Filed Oct. 19, 1927
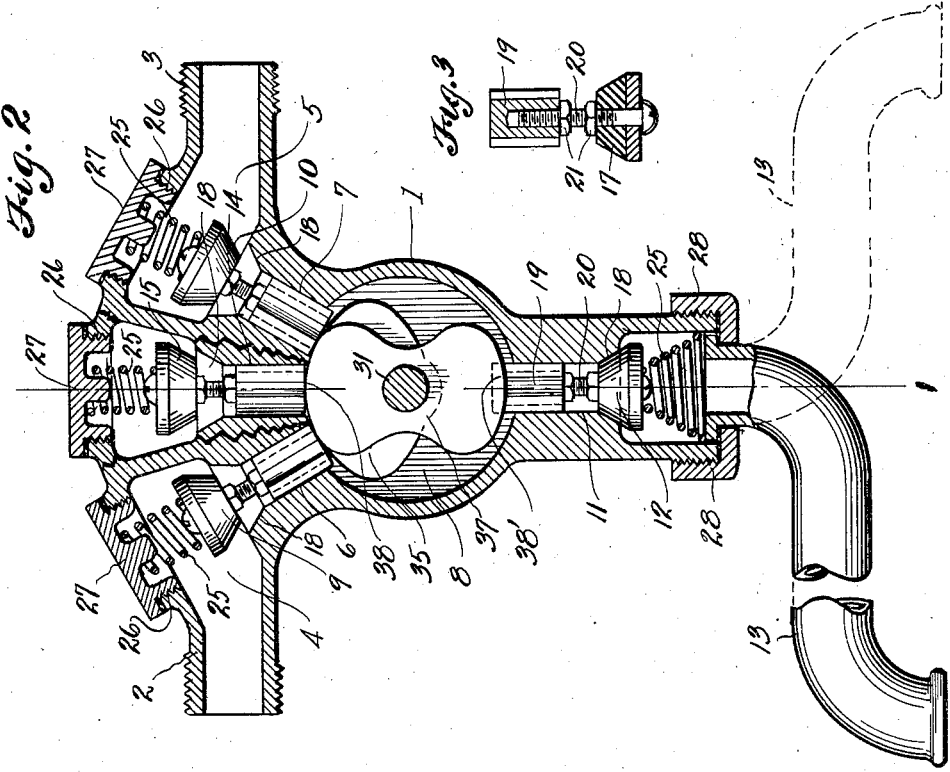
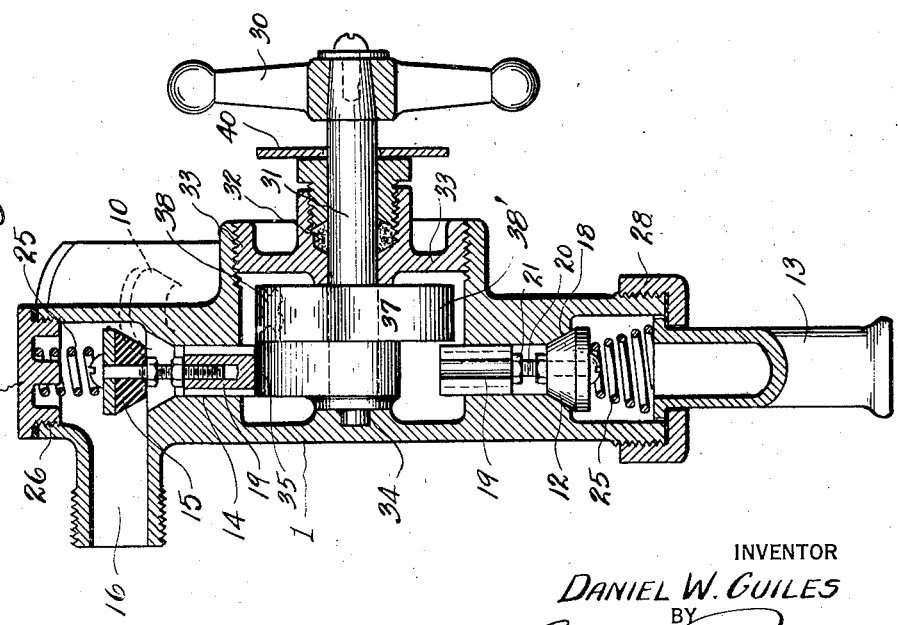
INVENTOR
DANIEL W. GUILES
BY
Cook & Robinson
ATTORNEY Patented Sept. 8, 1931

1,822,346

UNITED STATES PATENT OFFICE

DANIEL W. GUILES, OF SEATTLE, WASHINGTON

FAUCET

Application filed October 19, 1927. Serial No. 227,230.

This invention relates to improvements in faucets, and particularly to faucets of that character designed for use in connection with both hot and cold water supply pipes; it being the principal object of the present invention to provide a faucet that is especially desirable for use in connection with bathroom plumbing or fixtures, in that it can be used to control the hot and cold water connections for both the bathtub and shower bath fixtures.

More specifically stated, the present invention resides in the provision of a faucet of the above character comprising a valve housing provided with valved inlets for hot and cold water connections and having valved outlets for connection with shower and tub fixtures, and equipped with a valve actuating handle that may be adjusted from neutral position to positions for admitting hot or cold water or for admitting both together in desired proportions and for controlling the discharge of water through either the shower or the tub connection.

Another object of the invention is to provide the valves with adjustable stems whereby the extent to which they are opened may be regulated.

Other objects of the invention reside in the various details of construction and in the combination of parts as is hereinafter described.

In accomplishing these objects, I have provided the improved details of construction, the preferred forms of which are illustrated in the accompanying drawings, wherein—

Figure 1 is a vertical section of a faucet constructed in accordance with the present invention; the section being taken substantially on the line 1—1 in Figure 2.

Figure 2 is a vertical section of the faucet.

Figure 3 is a sectional view of one of the valves.

Referring more in detail to the drawings—

1 designates the valve housing which is provided at opposite sides with extensions 2 and 3 adapted for connection, respectively, with hot and cold water supply pipes. These extensions provide inlet passages 4 and 5 into the top of the valve housing, which are connected, respectively, by means of valve channels 6 and 7, with a centrally and circularly formed mixing chamber 8. The inflow of water from the passages 4 and 5 into the chamber 8 is controlled by valve members designated in their entirety by reference numerals 9 and 10. At the bottom of the chamber 8 is a discharge channel 11 equipped with a valve 12; the channel 11 providing connection with a discharge spout 13. Leading from the top of the chamber 8, is an outlet channel 14 equipped with a valve 15; this channel opening into a rearwardly directed passage 16 to which connection may be made with a shower bath or other fixture.

Each of the valves 9, 10, 12 and 15 comprises a conically tapered head portion 17, as designated in Figure 3, that is adapted to a correspondingly tapered seat 18 in the channel with which it is associated and each head has a valve stem 19 connected therewith by means of a threaded bolt 20; the bolt being fixed in the head and threaded into the stem to permit adjustment of the latter. Each bolt also has lock nuts 21 thereon adapted to be tightened against the valve and against the end of the stem to lock them at adjusted positions. All of the valves open outwardly away from the chamber 8 and are urged toward and normally held in closed position by coiled springs 25 which are positioned to bear against the valve heads.

Access to the channels for positioning the two inlet valves 9 and 10 and the discharge valve 15 may be had through openings 26 in the top of the housing, that are alined with the valves and into which plugs, or caps, 27 are threaded. Access to the valve 12 may be had by removing the spout 13, which is held in place by a collar 28 that is threaded onto the lower end of the housing and which supports the spout in such manner that the latter may be adjustably revolved from side to side.

For the purpose of opening the various valves to control the discharge of water from the faucet, I have provided a handle 30 that is fixed to the outer end of a cam shaft 31. This shaft extends through a packed gland 32 in a plug 33 that is threaded into the front end of the chamber 8 to close the latter and, at its inner end, seats in a socket 34 provided in the rear wall of the chamber. Fixed on this shaft, within the chamber, is a cam 35 having a radially curved surface adapted to engage with the inner end of the stem of the valve 15 to unseat the valve for the discharge of water through the outlet 16. Also, fixed on the stem at the outside of cam 35 is another cam 37 having two camming surfaces 38—38' at diametrically opposite sides which are adapted to engage with the inner ends of the stems of valves 9 and 10 to unseat them to admit water into chamber 8 from the hot and cold water connections. These surfaces provide also that either valve may be opened independently of the other, or both may be opened together, and the cam surfaces are rounded off at their ends to provide for opening the valves to any extent between their limits of travel.

It will be stated here that the outlet valves 12 and 15 are alined vertically and that the inlet valves 9 and 10 are disposed in a plane forwardly of the plane of the outlet valves. The cam 35 also is centered with respect to the cam surface 38 and is of greater extent so that when the cams are adjusted or rotated by the handle into position for discharging water past the valve 15, this valve will be opened at the same instant either inlet valve is opened. Also, in closing off the flow, it will be held open as long as either inlet valve is held open.

Assuming the faucet to be so constructed, it is used as follows:

For drawing off either cold or hot water through the spout 13 the handle 30 is rotated to a position at which the cam surface 38' will engage with the stem of valve 9 or valve 10 to open the latter to admit water to chamber 8. At the same time cam 35 will engage the stem of valve 12 to open this valve to permit the water to be discharged through the spout 13. If a mixture of hot and cold water is desired, the cam surface 38' is adjusted to engage and open both inlet valves, 9 and 10, while, at the same time, the cam 35 holds valve 12 open. If it is desired to discharge the water through the outlet 16 to the shower connection, the cams are rotated through an angle of 180° from this position to the position as in Figure 2, at which cam surface 38 will open the inlet valves and cam 35 will open the valve 15. By adjustment toward either side, either of the inlet valves may be partly or entirely closed while the other is still held open. In this way a desired mixture of hot and cold water may be obtained. To close the faucet, the handle is turned to a neutral position at which all valves are disengaged and held closed by their respective springs.

If it is desired, a plate, as at 40, in Figure 1, may be fixed to the valve housing and on this markings placed and the handle provided with a suitable mark to be brought into registration with these marks to serve as a means for determining the proper position of the handle for the drawing off of hot or cold water through either the shower connection or spout 13.

Having thus described my invention, what I claim as new therein and desire to secure by Letters Patent, is:

A faucet comprising a housing forming a mixing chamber having upper and lower outlets and having inlets for hot and cold water located, respectively, at opposite sides of one of said outlets and in a plane offset therefrom, valves for the outlets and inlets, yieldable means normally retaining the valves closed, stems for the valves extended into the chamber, a shaft coaxial of the housing, a cam on the shaft for engaging stems of the outlet valves to individually and selectively open the valves, and another cam on the shaft having oppositely disposed cam heads; one of said heads being adapted to engage the stems of the inlet valves to adustably open one or both valves while the first mentioned cam retains the valve of the upper outlet opened, the other head being adapted to likewise hold the inlet valves open while the first cam opens the valve of the lower outlet.

Signed at Seattle, Washington, this 24th day of September, 1927.

DANIEL W. GUILES.